United States Patent Office 3,199,531
Patented Aug. 10, 1965

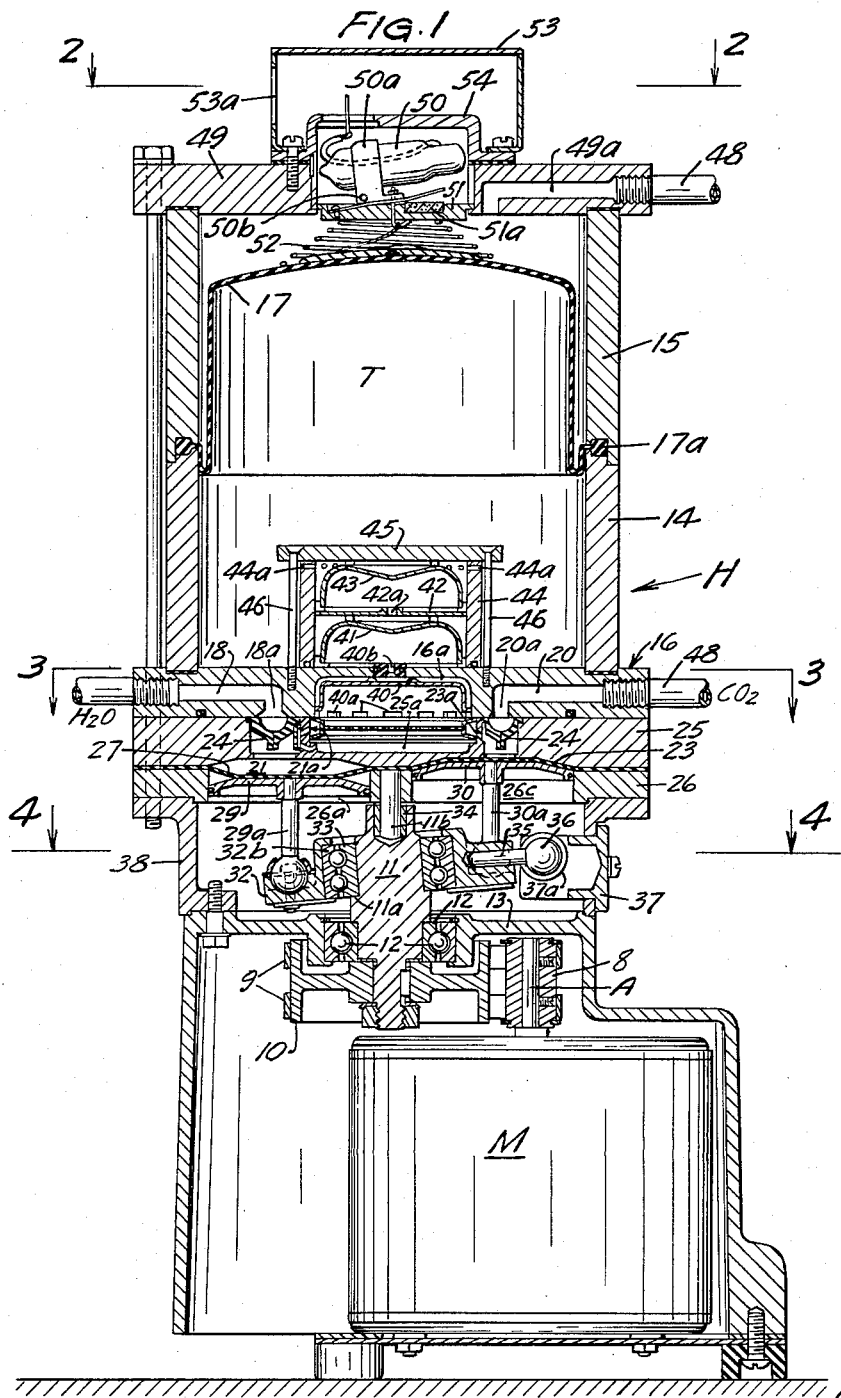
INVENTORS
RICHARD T. CORNELIUS
HAROLD E. DUFRESNE
BY Williamson + Palmatier
ATTORNEYS

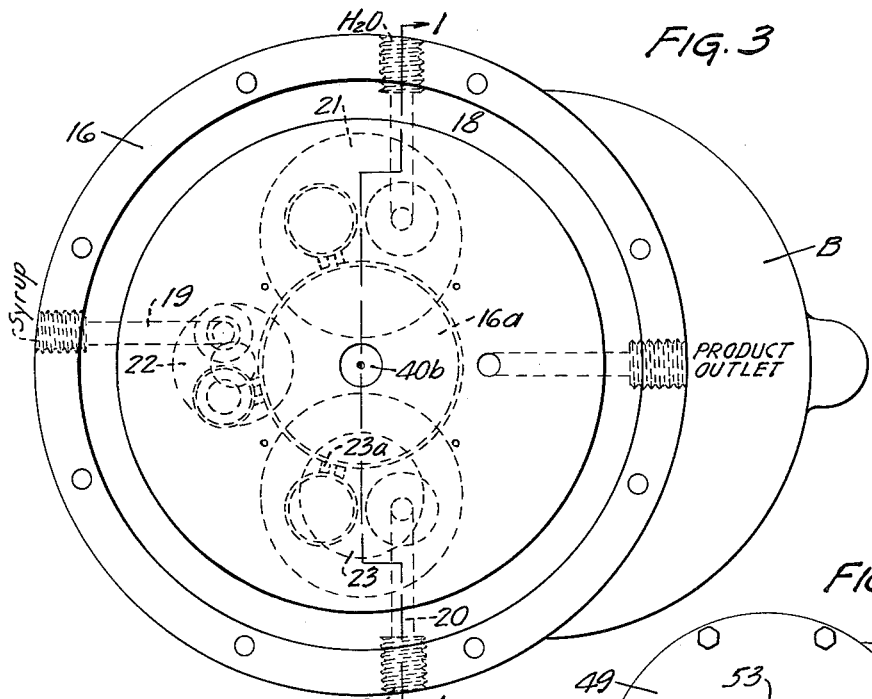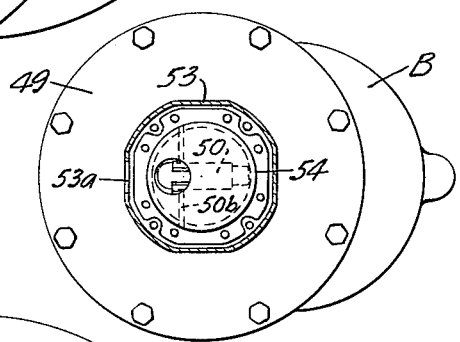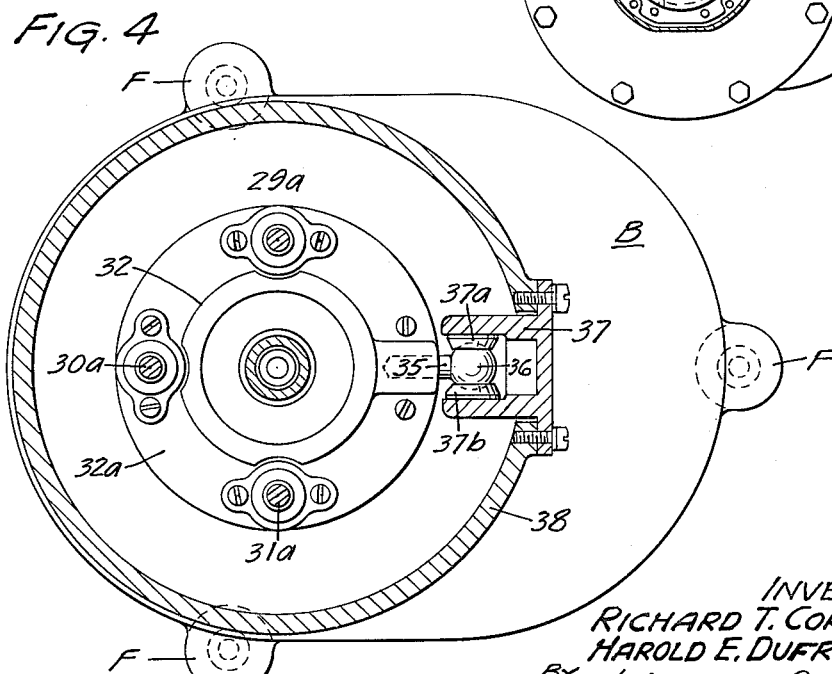

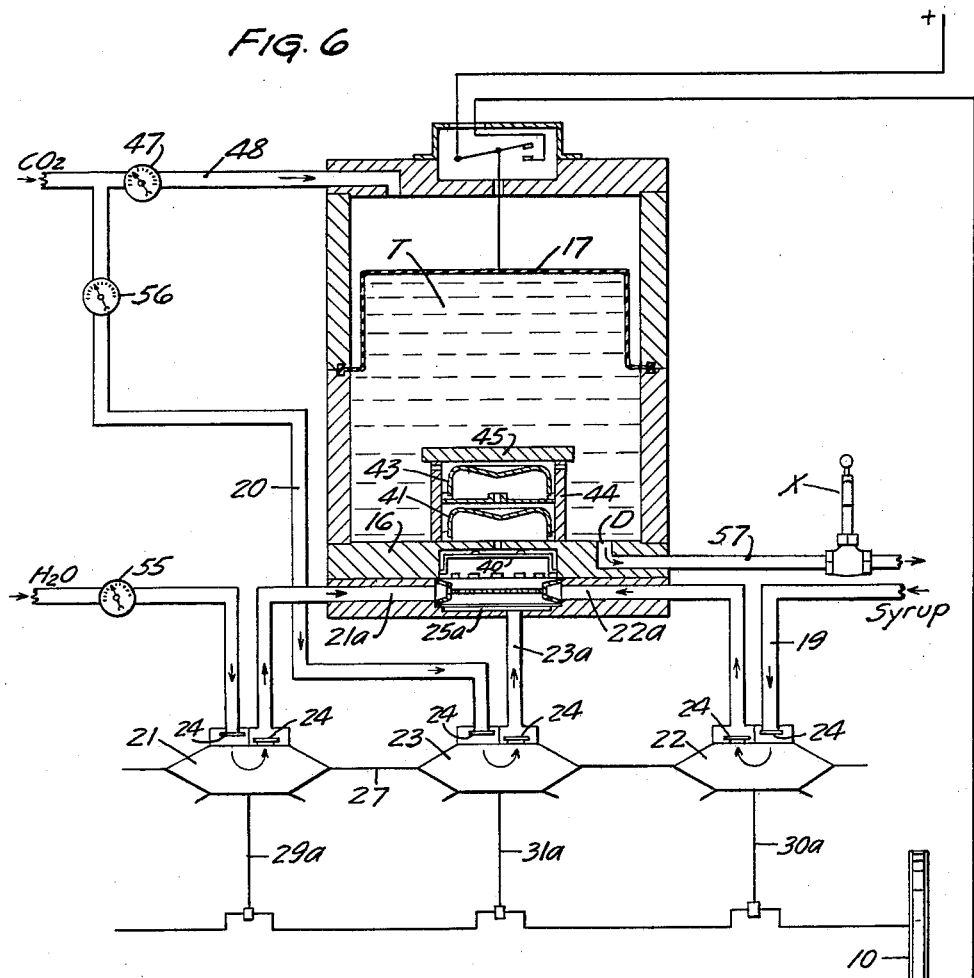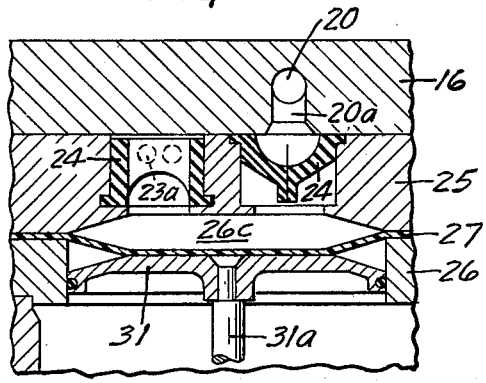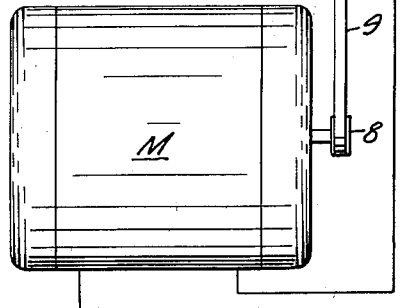

3,199,531
APPARATUS FOR METERING AND MIXING FLOWABLE INGREDIENTS TO CONTINUOUSLY SUPPLY A PREDETERMINED MIXTURE
Richard T. Cornelius, Minneapolis, and Harold E. Dufresne, St. Paul, Minn., assignors to The Cornelius Company, Anoka, Minn., a corporation of Minnesota
Filed June 18, 1962, Ser. No. 203,361
6 Claims. (Cl. 137—394)

This invention relates to the accurate metering and admixing of a plurality of flowable ingredients to produce a dispensable supply of a mixture having predetermined characteristics. The invention, while not limited to, is particularly well adapted for the automatic production of carbonated beverages and the like, where constant maintenance of characteristics including proportions of ingredients, extent of carbonization and constant pressure supply for withdrawal are desired.

It is an object of the invention to provide unitary, self-contained apparatus of compact form, which automatically will produce and meter, flow of essential ingredients into a mixing chamber, and will efficiently admix said ingredients and communicate the mixture into a reserve tank for subsequent intermittent and continuous withdrawals at substantially constant discharge pressure.

The aforesaid apparatus is closely interdependent with a simple, highly efficient process for producing and maintaining a reserve supply of a predetermined fluid mixture from sources of flowable ingredients, by intermittent power actuation of metered flow-inducing media in response to a predetermined depletion in the volume of the reserve supply of the mixture. The process includes the steps of inducing metered flow of the several essential ingredients for a predetermined mixture from the respective ingredient sources to a mixing chamber, utilizing such flow to efficiently admix the said ingredients in the mixing chamber, communicating the mixture to a reserve tank and maintaining the mixture in said reserve tank at a substantially constant discharge pressure whereby a mixture having predetermined characteristics may be withdrawn from time to time at will. The process is characterized by controlling the flow and admixing of ingredients in response to predetermined depletion of the volume of the mixture in the reserve tank.

The apparatus and process of this invention has wide general usage for supplying metered, predetermined mixtures of fluid and fluidized materials and may be used as a small bottling plant for carbonated beverages.

In carrying out the invention it was discovered that all working mechanism and essential components including an expansible reserve tank, a mixing chamber and metered flow-inducing means may be compactly contained within a unitary structure or housing well adapted to be mounted and usable for mixed carbonated beverages and the like within counters, store fixtures and bars for accomplishing the foregoing advantages and functions and for making available subsequent discharge of the mixture from time to time as desired.

Said invention, in the form disclosed, utilizes an expansible reserve tank positioned preferably near the top of the unitary structure and having communication from below with a relatively small, efficient mixing chamber. This mixing chamber has communication at spaced points in the interior thereof with check valve inlet passages, each of which is connected with one of the sources of the requisite flowable ingredients. Power means such as an electric motor is mounted preferably in the base portion of the unit which by intermittent control actuates a series of predeterminately proportioned flow-inducing mechanisms, one for each source of ingredients (such as diaphragm pumps) for forcibly causing the ingredients to flow into the mixing chamber. The pistons or other displacement means of the pumps or flow-inducing mechanisms are proportioned in accordance with the precise desired proportions of the respective ingredients desired in the ultimate mixture. Thus accurate metering of the ingredients into the mixing chamber is assured. The construction of the mixing chamber and entrance of the flowable ingredients is such that a thorough admixture is obtained, which mixture is continuously, during actuation, transmitted to the reserve tank.

The contents of the reserve tank is maintained at a substantially constant pressure, in the form shown, by being subjected to an external gaseous pressure at a predetermined desirable level. The tank as shown, is provided with a suitable faucet discharge whereby the mixture with predetermined characteristics may be withdrawn from time to time as desired.

The actuating mechanism is operated in response to a predetermined partial depletion of the volumetric contents of the reserve tank and is preferably controlled by an electrical circuit to the motor. The circuit includes a switch responsive to shrinkage of the volume of said tank to energize the motor circuit and again responsive to the increase of volume in the tank to thereafter deenergize the motor circuit.

Flow-inducing or pump mechanism of the diaphragm type is preferred with the pistons or other displacement means of the system being proportioned precisely with the desired metering of the ingredients. A common diaphragm or individual diaphragms are interposed between the displacement media and the flow of the ingredients so that oil and all contaminated material may be excluded from the flow and the mixture.

The foregoing combinations of parts, process steps and purposes and functional advantages of the invention will more fully appear from the following description made in connection with the accompanying drawings, wherein:

FIG. 1 is a vertical section taken substantially (diametrically) along the line 1—1 of FIG. 3 through an embodiment of the inventive apparatus, which is particularly adapted as a metered drink mixer;

FIG. 2 is a cross section taken on the line 2—2 of FIG. 1 showing the top and sealed switch box for controlling the electrical circuit;

FIG. 3 is a cross section taken substantially along the line 3—3 of FIG. 1 illustrating the positioning of the several pumping chambers as well as the mixing chamber and intake passages for communication with the sources of the flowable ingredients and product-outlet passage;

FIG. 4 is a cross section taken on the line 4—4 of FIG. 1 showing a portion of the actuating wobble plate structure and the piston rod for the pumping system;

FIG. 5 is a detail vertical sectional view taken on a larger scale illustrating one of the pistons of the diaphragm pumps together with the two check valves associated therewith; and FIG. 6 is a diagrammatic view of the entire system including the controlling electrical circuit for energizing and deenergizing the actuating mechanism in response to a predetermined diminishing of the contents of the supply tank.

In the form of the invention illustrated, all working parts and components are compactly contained within a generally cylindrical housing indicated as an entirety by the letter H, which includes a rigid base shell B supported upon a plurality of cushioning feet F. As shown an electrical motor M is eccentrically mounted within said base shell having its armature shaft A disposed vertically and provided with a driving pulley 8, which as shown is connected by a pair of driving belts 9 with a driven pulley 10 affixed to the lower end of a driven shaft 11 which is journaled by ball bearing and races 12 in the top rigid plate of the base shell B.

Housing H as shown has a pair of coaxial upper sleeve sections 14 and 15 which cooperate with a large circular bottom plate 16 and an expansible, flexible and preferably stretchable upper partition 17 to form a sealed supply tank, the storage chamber of which is indicated as an entirety by the letter T. The upper partition 17 is preferably preformed in a dome shape from suitable flexible and preferably stretchable material such as available Latex or even plastic materials having as shown a beaded peripheral edge 17a which is clamped in sealed relation between the abutting circular edges of the upper and lower sleeves 15 and 14 respectively. The lower edge of the lower sleeve 14 fits with sealed relation an annular groove in the bottom 16 of the tank.

The bottom plate 16 of the tank is relatively thick and is drilled or otherwise formed along three generally radial lines (see FIGS. 1 and 3) to provide three ingredient-intake passages 18, 19 and 20, respectively, for communication with three sources of ingredients, which for example for production of a carbonated beverage, may be for water supply, syrup or concentrate supply, and carbon dioxide, respectively. These passages 18, 19 and 20 extend as shown from the periphery of the bottom plate 16 to points disposed respectively above recessed pumping chambers of varying size for the three ingredients. The largest pumping chamber for water in the example chosen is indicated by 21, a substantially smaller chamber for the syrup or concentrate being indicated by 22, and the pumping chamber for the gas or $CO_2$ being indicated by the numeral 23. Descending vertical ports 18a, 19a and 20a communicate the inner ends of passages 18, 19 and 20 with the respective pumping chambers 21, 22 and 23. A suitable check valve 24 which may be in the form of a split nipple, synthetic rubber element as illustrated in FIG. 5 is affixed below each of the ports 18a, 19a and 20a, permitting passage of the fluid downwardly into the associated pumping chamber but preventing backward flow of material.

In the form of the invention illustrated, the respective pumping chambers are defined and constructed by a pair of cooperating, relatively thick disc plates 25 and 26 between which a preferably integral, flexible and relatively non-stretchable, impervious diaphragm 27 is secured and sealed. Said diaphragm as shown extends smoothly across substantially the entire diameter of housing H at the medial portion thereof. The upper disc plate 25 is recessed concavely in three circumferentially spaced areas to define the upper portions of the pump chambers 21, 22 and 23, and the respective diameters of such concaved areas are accurately proportioned for cooperation with the respective pump pistons disposed therebelow and also disposed below the impervious diaphragm 27. The axial or central upper portion of upper disc plate 25 is cylindrically recessed at 25a to form the lower portion or bottom of a mixing chamber later to be described in detail. Communication of the several pumping chambers 21, 22 and 23 is made with the lower portion of the mixing chamber through the cylindrical wall of recessed portion 25a through radial ports 21a, 22a and 23a respectively, said ports being equipped with check valves 24 which may be of similar construction to the check valves first described and which permit inward passage of the fluid ingredients from said pump chambers into the base of the mixing chamber. The construction and arrangement of the inlet and outlet passages or ports to and from one of the pumping chambers are illustrated on an enlarged scale and in detail in FIG. 5 of the drawings.

The lower disc plate 26 which cooperates with plate 25 to form the respective pumping chambers is provided with three circumferentially spaced bores 26a, 26b and 26c having smooth machined surfaces for constituting cylinders of similar diameter to the full diameters of the concave recesses which are axially aligned therewith and which are supplied by the upper disc plate 25. These cylindrical bores 26a, 26b and 26c slidably accommodate pump pistons 29, 30 and 31 respectively for the pump mechanisms in the example shown of water pump, the syrup or concentrate pump and the $CO_2$ pump, and the pistons are of predetermined areas to produce in conjunction with the respective pump chambers displacements in the precise proportion of the several ingredients desired in the ultimate mixture. The pistons 29, 30 and 31 are provided with depending short piston rods 29a, 30a and 31a respectively, which terminate in balls, socket-retained in sockets provided by the annular flange 32a of a bossed wobble plate indicated as an entirety by the numeral 32. Wobble plate 32, as shown, is mounted for wobbling motion upon a ball race 33 which is fixed to the upper and slightly inclined portion of the shaft 11 and fitted above a shoulder 11a of said shaft. Shaft 11 has in its upper extremity a journal with bearing 34 which locates in axial relation about an extended shaft 11b from the lower plate disc 26. Wobble plate 32 carries the ball race 32b thus permitting free rotation of the shaft 11 with the attendant wobbling or fluctuation of the wobble plate 32. The wobble plate is held against revolution by a radial pin 35 which terminates in an outer ball 36 confined in a socket 37 affixed to one side of an upstanding sleeve 38 which joins the top of base shell B with the underside of the disc plate 26. The socket 37 as clearly shown in FIG. 4 is of U-shaped cross section having mounted therein a pair of opposed, slidable socket-shoes 37a and 37b, having sockets for receiving opposite sides of the ball 36 to allow for revolving action and up and down movement of the ball in the wobble plate performance.

While in the form of the invention illustrated the operation of the plurality of pumps or other flow-inducing mechanism is in sequence through the wobbling of the plate 32, it will of course be understood that other flow-inducing mechanism can be utilized where the respective flow-inducing mechanism is simultaneously operated.

Highly efficient mixing mechanism is provided as shown, actuated through the flow of the fluid ingredients therethrough. As shown the heavy bottom plate 16 is provided with an axial cylindrical recess 16a in the bottom thereof, conforming and concentrically disposed with the recess 25a formed in disc plate 25 and a chamber lining 40 is disposed in recesses 16a and 25a, having a multiplicity of circumferentially spaced, radial ingredient-entrance ports 40a through which the incoming flowing ingredients travel. Axial outlet port 40b is formed through the bottom plate 16 communicating with the open bottom of an inverted mixing cup 41 which is spaced a short distance above the bottom plate 16. The incoming ingredients through flow produce toric currents beneath the shell or cup 41 with the result that the ingredients are quite thoroughly admixed and emanate below the skirt of the cup 41, passing upwardly and then centrally through a horizontal plate 42 which is mounted in fixed and slightly spaced relation to cup 41 and is provided with an axial outlet port 42a communicating with the open bottom of a second similar mixing cup 43, the said cups and plate 42 all being mounted and affixed to a cylindrical frame having a peripheral wall 44 and a top 45. The said frame is secured by bolts 46 or the like to the top and central portion of the bottom plate 16.

The construction and shape of the inverted cups 41 and 43 and relationship with discharge passages is an important feature in that the liquids must pass circumferentially radially below the skirts of said cups before arising, which causes the gas to be held until substantially used up by subsequent liquids within the dome portions of the cups.

The top and upper end of the tank chamber T in the form shown is subjected to a constant external pressure supplied if desired by the same source of gas as is included in the mixture, such as $CO_2$, which enters from an individual or separate pressure regulator 47 (see FIG. 6) through a conduit 48 into a radial passage 49a formed through the thick cover plate 49 of the general housing. This pressure is applied to the top and sides of the flexible dome shaped partition 17, constituting a part of the reserve tank.

In the form illustrated, efficient sealed mechanism is provided for controlling intermittent actuation of the motor M and consequent sequential pumping action of the three pumping pistons 29, 30 and 31 through the wobble plate 32. As shown, this mechanism includes a mercury tube switch having its tube 50 of conventional structure mounted for oscillation in a suitable holding device 50a which is pivoted on a transverse axis 50b, constituting a pin journaled on a circular plate 51 confined within and held against a ledge of an axial bore made through the top of the heavy cover plate 49. From the position shown in FIG. 1, the tank chamber T is substantially filled to capacity, the mercury tube switch is in open position and the motor is idle. A cushioning spring of spiral construction 52 is interposed between the bottom of the circular plate 51 and the top or central portion of the dome partition 17 of the tank having as shown, its upper coil extending through the circular plate 51 and connected with the holder 50a of the mercury switch to tilt the switch upwardly at the right hand when the tank is distended upwardly to a predetermined position. When the tank diminishes in volume the dome top 17 recedes due to the external pressure provided above, the spring 52 is pulled downwardly and with it the mercury tube is tilted on its axis, the mercury then covering the two contacts within and closing the circuit through the motor.

The mercury tube is entirely sealed with its connections by this cover plate 49 and a dome member 54. A service opening 53a is shown in the circumference of the housing 53 which has an internal flange secured to a dome member 54 directly housing the upper portion of the mercury tube switch. The housing 53 encloses and provides protection to the wired electrical connections brought through opening 53a and terminating at sealed connections in dome member 54.

The unitary apparatus or machine as illustrated is connected up in the example, and the flow-inducing means volumetrically proportioned for producing a carbonated beverage from the three ingredients, water, carbon dioxide and a syrup concentrate. By reference to FIGS. 1 and 6 of the drawings it will be seen that the source of water under pressure is connected by a supply conduit $H_2O$ through a regulator valve 55 to communicate with the pumping chamber 21 above diaphragm 27. The source of gas (carbon dioxide) is connected by a conduit $CO_2$ through a separate regulator valve 56 to the passage 20 communicating with pumping chamber 23 above the common diaphragm 27. The source of syrup or concentrate is connected by a conduit syrup by means of passage 19 with the pumping chamber 22 disposed above the common diaphragm 27.

A mixture discharge passage D is provided in the bottom plate 16 of the housing communicating with a discharge conduit 57 which as shown is provided with a discharge faucet X.

*Operation*

In operation the pressure-regulator valves 55 and 56 are set for the predetermined supply pressure for admission of water and carbon dioxide respectively to the pumping chambers 21 and 23. The pressure regulator valve 47 is properly set for flow of gas to maintain a substantially constant pressure which may be derived from the soure of carbon dioxide to the upper portion of the housing externally of the flexible dome partition 17 of the tank.

The electrical circuit controlling the actuation of motor M is illustrated in FIG. 6 with the mercury tube switch in open position.

It is understood that the volumetric displacement of the three pumps or flow-inducing medias are proportioned precisely to the desired proportions of the three flowable ingredients in the ultimate mixture. In the form illustrated the strokes of the piston rods 29a, 30a and 31a are equal and thus the ratio or metering of ingredients may be determined by the diameters or areas of the pistons 29, 30 and 31. In the form shown the operation of the respective pumps is sequential because of the mechanics of the wobble plate 32 but it will of course be understood that various other forms of flow-inducing means including reciprocating pumping elements or rotary pumps may be employed simultaneously operating upon the three ingredients, all within the scope of the invention.

When the volume of the mixture contained within the chamber T of the tank is diminished beyond a predetermined content, the flexible dome 17 of the tank drops and pulls downwardly upon the upper extremity of the spring 52 which is connected with the mercury tube switch, thus tilting the right end thereof downwardly as shown in FIGS. 1 and 6 and closing the circuit to actuate motor M and thus to drive the shaft 11 which actuates the wobble plate 32, bringing about the sequential operation of the pistons 29, 30 and 31.

It will be noted that all of the working parts including the pistons, piston rods and wobble plate are separated by the common diaphragm 27 from the respective pumping chambers 21, 22 and 23 so that the ingredients cannot be contaminated by oil or other contaminating substances in the operation of the apparatus.

The check valve system for each pumping chamber has been previously described, preventing backward flow of the ingredients through the passages 18, 19 and 20, and permitting inward flow of the respective ingredients from the pumping chamber to the lower portion of the common mixing chamber provided by the central recess 25a and the liner 40. The ingredients enter said mixing chamber at the lower end thereof through a multiplicity of radial ports 40a and in such a diversified entrance preliminarily admix, flowing upwardly through the axial passage 40b into the skirt of the inverted mixing cup 41. The entrance of the preliminarily mixed ingredients into cup 41 produces toric currents or vortices which effects thorough admixing of the ingredients. The mixed ingredients must exit from beneath the skirt of cup 41 and then pass upwardly and radially inwardly to the axial passage 42a in the medial plate 42 to the bottom of the second inverted mixing cup 43. There again toric currents and vortices are produced in the flow with attendant mixing of the ingredients and the mixture must pass below the skirt of the upper mixing cup 43 and then upwardly and is discharged into the tank through a series of radial ports 44a provided near the upper edge of the peripheral wall 44 of the mixing chamber.

Actuation of motor M and the wobble plate 32 and the several pumping mechanisms is continued until the flexible dome partition 17 of the tank is distended against the pressure of the external gas above the dome to a predetermined extent.

In other words when the accumulated volume of the reserve tank exceeds a predetermined amount the spring 52 is compressed to a point where its connection with the mercury tube switch tilts the same anticlockwise as viewed in FIGS. 1 and 6, opening the electrical circuit and stopping the operation of the motor and wobble plate.

The metered reserve mixture may be withdrawn at will through operation of the faucet or discharge valve X although it will of course be understood that a constant discharge of the metered mixture through conduit 57 may be had if the device is to be used as a small carbonation plant or the like.

Regardless of the volume of mixture in chamber T of the tank the contents will be always under the set or predetermined pressure which is highly desirable in a process and apparatus of the type herein disclosed.

The novel process disclosed herein as well as the apparatus and combination of parts best suited for carrying out the same is accurate, simplified and economical as contrasted with prior art processes and apparatus known to applicant.

It will of course be understood that various changes may be made in the form, details, and specific parts and that other forms and combinations may be adopted as may come within the scope of the claims herein.

What is claimed is:

1. In apparatus for predeterminately metering and mixing flowable ingredients to produce a reserve supply of a predetermined mixture comprising
    an elongated unitary housing having a reserve tank disposed therewithin, said tank including a flexible volume varying portion disposed within the upper portion of said housing thereof,
    means defining a mixing chamber disposed inwardly of said tank within said housing and having communication with said tank,
    said housing including means adjacent said mixing chamber defining inlet passages connectible with said respective sources of said flowable ingredients,
    flow-inducing mechanisms mounted within said housing adjacent said mixing chamber, one being provided for each of said inlet sources and communicating at discharge with said mixing chamber,
    said flow-inducing mechanisms having displacement means proportioned respectively to induce volumetric flow into said mixing chamber at a predetermined ratio, and
    operating mechanism operatively connected to said flow inducing mechanism to operate said flow inducing mechanism substantially simultaneously and to cause the mixed ingredients therein to flow into the tank simultaneously with the flow of ingredients into the mixing chamber,
    control mechanism also mounted within said housing for intermittently actuating said operating mechanisms in response to predetermined variation in the volume of said reserve tank.

2. The structure and combination set forth in claim 1 wherein said flow-inducing mechanisms are of the displaceable diaphragm type and wherein a common flexible diaphragm substantially traverses and is sealed with said housing, forming in portions thereof the displaceable ends of respective pumping chambers, each having discharges communicating with said mixing chambers.

3. The structure and combination set forth in claim 1 further characterized by
    means for subjecting said flexible portion to a substantially constant fluid pressure, and
    said intermittently actuated mechanisms being connected for driving with an electric motor which is included in an electrical circuit having a control switch responsive to predetermined variation in the volume of the flexible portion of said tank.

4. The structure and combination set forth in claim 1 wherein said several flow-inducing mechanisms include pistons disposed inwardly of said diaphragm sections, and wherein said pistons are actuated in sequence through the medium of a common wobble plate.

5. Apparatus for predeterminately measuring and mixing flowable ingredients to produce a reserve supply of a predetermined mixture comprising
    an elongate unitary housing having a reserve tank disposed within one portion thereof,
    a hollow mixing chamber structure disposed inwardly of said tank and having communication with said tank,
    mixing mechanism within said chamber structure for causing alternate radial and axial flow of the ingredients flowing into said chamber to thereby produce thorough admixing of such ingredients,
    a plurality of inlet sources to said mixing chamber structure, each connectible with a source of fluid ingredient,
    a plurality of pump mechanisms mounted within said housing adjacent said mixing chamber structure, one being provided for each of said inlets and communicating a discharge with said mixing chamber structure,
    each pump mechanism including a reciprocable piston, the areas of said several pistons varying in accordance with a predetermined ratio to produce metered flow of said respective ingredients in a desired ratio,
    a common flexible diaphragm covering all of said pistons and portions thereof defining in each instance a flexible end of the associated pumping chamber,
    drive mechanism for operating said pumping mechanisms including a wobble plate operatively connected to said pistons to reciprocate the same substantially simultaneously,
    a flexible volume-bearing member disposed within said tank,
    means for subjecting said flexible volume-bearing member to a substantially constant fluid pressure, and a control mechanism mounted within said housing and being operatively connected with said flexible volume-bearing member and said drive mechanism to intermittently control operation of said drive mechanism in response to predetermined variation in volume of said reserve tank.

6. The apparatus as defined in claim 5 wherein said mixing mechanism includes a plurality of inverted generally dome-shaped cup elements disposed within said mixing chamber structure,
    and an orifice defining element interposed between adjacent of said cup elements and cooperating therewith for causing the fluid ingredients to alternately flow axially and radially of said mixing chamber structure.

References Cited by the Examiner
UNITED STATES PATENTS

| | | | |
|---|---|---|---|
| 1,820,266 | 8/31 | Bilderbeck | 103—173 XR |
| 2,051,932 | 8/36 | Alexander | 222—135 |
| 2,069,714 | 2/37 | Getchell | 138—42 |
| 2,314,421 | 3/43 | Peterson | 222—64 XR |
| 2,770,590 | 11/56 | Surduke | 137—209 XR |
| 2,774,364 | 12/56 | Brobeil | 222—64 XR |
| 2,983,153 | 5/61 | Zubaty | 103—173 XR |
| 2,991,723 | 7/61 | Zubaty | 103—173 XR |
| 3,063,411 | 11/62 | Phillips | 222—386.5 XR |

WILLIAM F. O'DEA, *Primary Examiner.*

ISADOR WEIL, *Examiner.*